March 30, 1965 F. HAUSER 3,176,083
RECORDING AND REPRODUCING MACHINE
Filed March 7, 1960 5 Sheets-Sheet 1

INVENTOR.
FRED HAUSER
BY
Mikatta and Glenny
ATTORNEYS

INVENTOR.
FRED HAUSER
BY
Miketta and Glenny
ATTORNEYS

March 30, 1965 F. HAUSER 3,176,083

RECORDING AND REPRODUCING MACHINE

Filed March 7, 1960 5 Sheets-Sheet 3

INVENTOR.
FRED HAUSER

BY

Miketta and Glenny
ATTORNEYS

March 30, 1965 F. HAUSER 3,176,083

RECORDING AND REPRODUCING MACHINE

Filed March 7, 1960 5 Sheets-Sheet 4

INVENTOR.
FRED HAUSER

BY

Miketta and Glenny
ATTORNEYS

INVENTOR.
FRED HAUSER

BY

Miketta and Glenny
ATTORNEYS 3,176,083

RECORDING AND REPRODUCING MACHINE

Fred Hauser, 1544 Midvale Ave., Los Angeles, Calif.

Filed Mar. 7, 1960, Ser. No. 13,094
6 Claims. (Cl. 179—100.2)

This invention pertains to a machine for producing letters, reports and other communications, such letters containing dictated and written intelligence. Moreover, the invention is directed to a machine which produces such letters and communications in a form capable of being readily transmitted or mailed. The invention is directed to a new article of manufacture consisting of a sheet material carrying both magnetic recordings of sound for aural reproduction and visible writing supplementing such recording.

Many prior patents relate to the magnetic recording of sounds; in most instances the dictated words are recorded upon a continuous tape carrying a suitable paramagnetic material. Reels of such tape are relatively thick and cannot be easily mailed, as, for example, a letter, but instead, require packaging for mailing. Moreover, it is impossible to modify, change, amplify or correct a magnetic recording without the necessity of re-recording.

The present invention is directed to a very simple and effective mechanism which is capable of recording spoken sounds and words upon a sheet of material having a plurality of transversely extending narrow parallel and spaced bands of paramagnetic recording media. The sound recording is thus placed upon the sheet material in the form of parallel transversely extending lines, similar to lines of printed matter upon a sheet of paper. Each line is dictated (and eventually reproduced) while the recording or reproducing head moves from left to right, again in a manner similar to that in which printing is read upon a printed page. The preferred sheet material employed in such machine carries the spaced transversely extending bands of paramagnetic material on one surface of the sheet, the opposing surface of the sheet being of matt-texture and adapted to receive visibly observable writing from writing instruments of the graphite pencil or ink pen types. As a result, the completed recorded sheet may be corrected by the insertion of commas, words, etc. by means of a common writing instrument applied to the matt surface of such sheet so that during reproduction of the magnetic recording the corrections and insertions are visible while the recorded sound is being heard and the reader or hearer of the reproduction may visibly insert the corrections while listening to the original recording.

The device of the present invention is also characterized by the utilization of a novel and efficient drive mechanism and construction whereby the desirable attributes and advantages of the present invention may be most readily obtained.

The present invention is not directed to the many available components and systems employed in the conversion of audible sound waves into electrical components or signals used in making a record, nor to the reproduction or playback of signals carried by the recorded medium into aurally audible sound. These systems and the components used therein shall be generically referred to herein as electro-acoustic transducers. These systems and components, including coated paper and plastic magnetic recording media, and erasing, recording and reproducing heads, have been described in many prior patents and publications, including United States Patents 1,640,881; 2,235,132; 2,351,004; 2,351,005; 2,418,542; 2,411,849, etc. Magnetic recording and playback heads which apply magnetizing force longitudinally and need not straddle the recording medium are preferred. The manner in which the para-magnetic recording material, iron oxide powder, iron or alloy, is deposited upon the carrier is also not a part of this invention and shall not be described in detail.

Generally stated, the machine for producing letters and other communications containing both dictated and written intelligence, embraced by the present invention, comprises a housing containing the electro-acoustic transducer system and means for advancing sheet material through the machine. The sheet material has longitudinal margins and a plurality of transversely extending narrow parallel and spaced bands of paramagnetic recording medium. A magnetic sound recording head within the housing and associated with the electro-acoustic transducer system is provided with means for repetitively moving the head transversely in recording relation to successive bands of recording medium on the sheet. Means are provided for advancing the sheet material step by step so that the successive lines of recording medium are subjected to the recording head. Either one or two recording heads may be used, as will become apparent from a description of exemplary embodiments of the invention.

An object of the present invention, therefore, is to disclose and provide a compact, simple and effective machine for producing letters and other communications on sheet material containing a plurality of transversely extending parallel spaced bands of paramagnetic recording medium.

Another object of the invention is to disclose and provide an improved and novel construction for letter writing machines whereby both dictated and written intelligence may be imparted and recorded upon a single sheet of material.

A still further object of the invention is to disclose and provide, as a new article of manufacture and commerce, sheet material adapted to carry magnetic recordings of sound on one surface and to receive visibly observable writing from writing instruments of the graphite pencil and ink pen types on the other surface in desired relationship to the dictated or recorded material.

These and various other objects, advantages, modifications, adaptations and uses of the present invention will become apparent to those skilled in the art from the following description of certain exemplary forms of the invention.

Reference will be made to the appended drawings of which:

Figure 1:
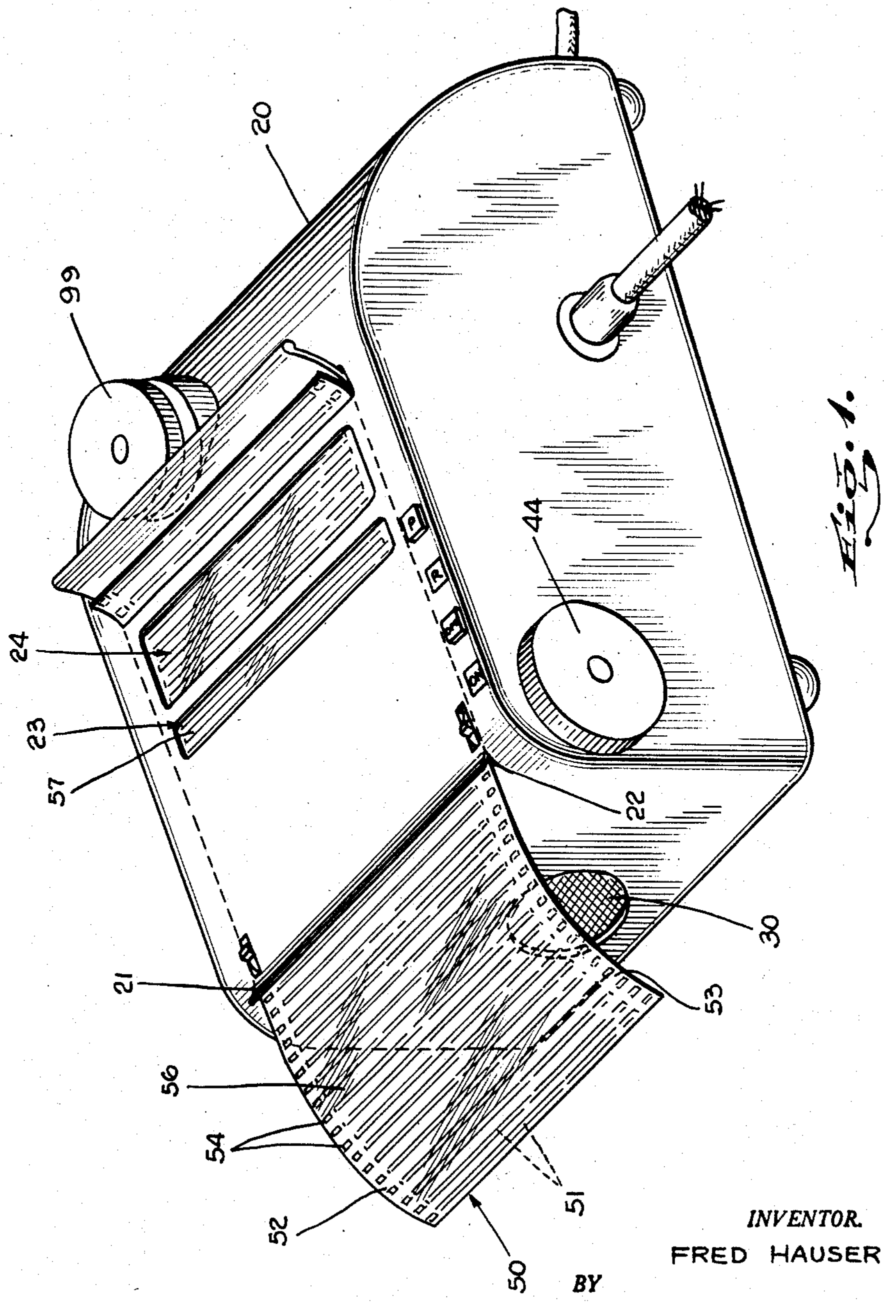
FIG. 1 is a perspective view of a dictating machine according to the invention.
Figure 2:
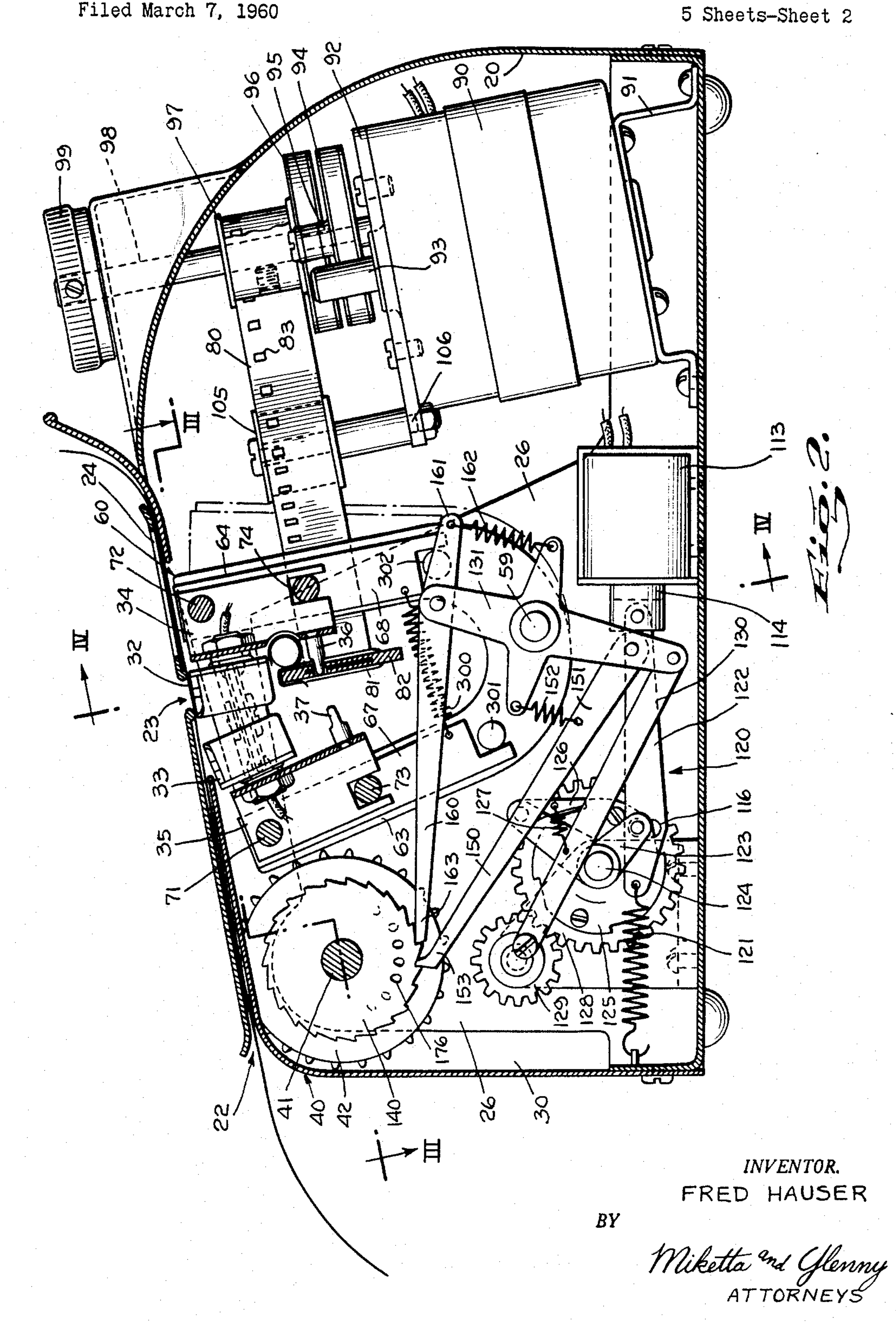
FIG. 2 is a sectioned side elevation of the machine of FIG. 1.
Figure 3:
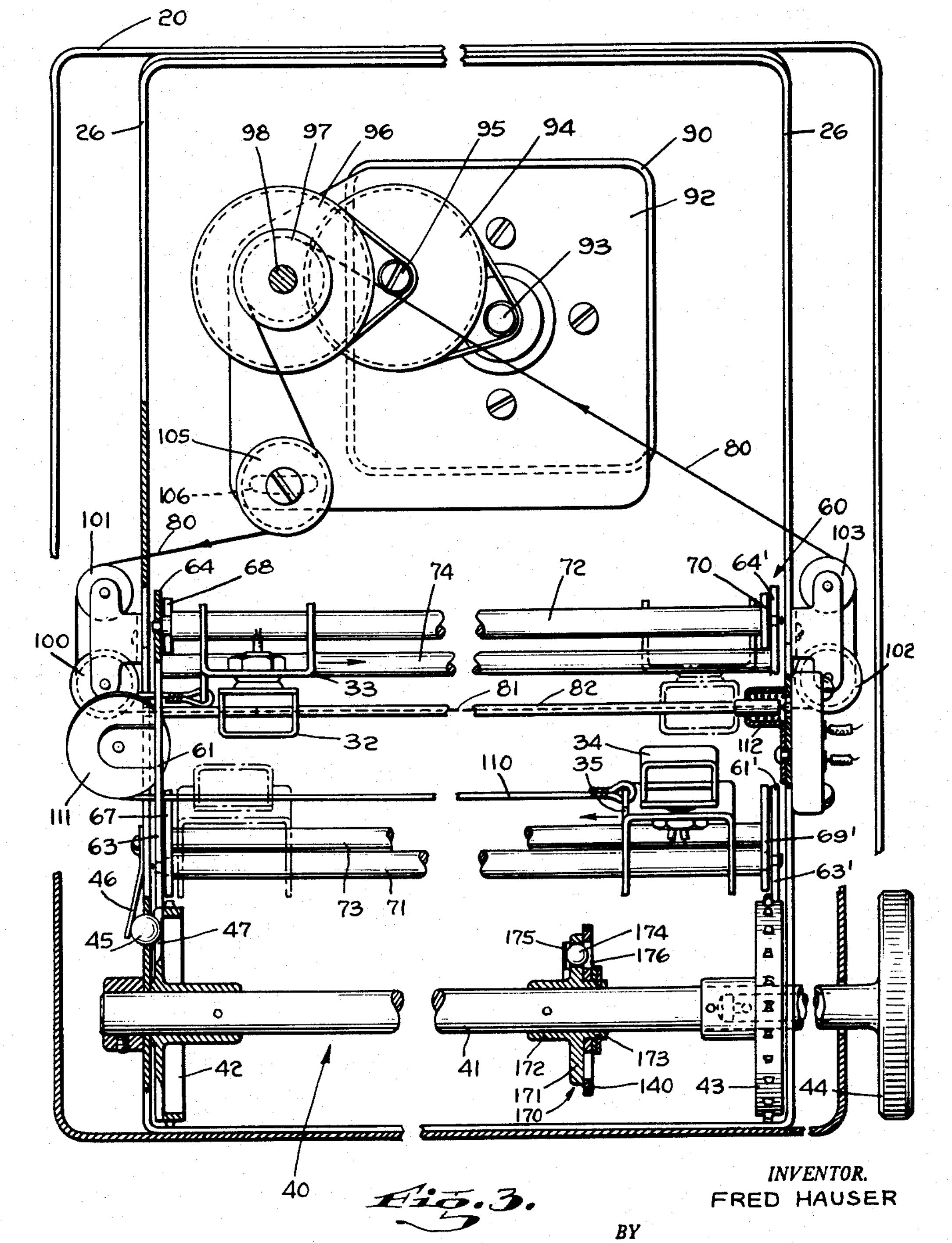
FIG. 3 is a plan view of the machine of FIG. 2 taken along the plane III—III.

Referring first to FIGS. 1 to 3 particularly, it can be seen that a preferred exemplary embodiment of a dictating machine, according to the invention, may comprise, in general: a housing 20; an electro-acoustic transducer system within the housing 20 and including, in part, a speaker 30, as shown in the front of housing 20 in FIG.

1, and a pair of magnetic sound recording, reproducing, and erasing heads 32 and 33 disposed just beneath the top surface of housing 20 upon an oscillatable yoke frame 60, as best seen in FIG. 2; and means, also within the housing 20 and indicated generally at 40 in FIGS. 2 and 3, for advancing sheet material 50 longitudinally through the dictating machine into successive aligned associations with the recording and reproducing heads 32 and 33. The magnetic recording, reproducing and erasing heads 32 and 33, hereafter referred to only as recording heads 32 and 33, may be alternatively interchanged with each other into a recording position by oscillating the yoke frame 60 and thereby allowing them to individually and alternatively act on the recording sheet material 50. Recording heads 32 and 33 are also provided with a reciprocating movement transverse to the width of the housing 20 upon carriages 34 and 35, respectively, which are slidably mounted on yoke frame 60. It should be noted that one recording head may be used, as will be described subsequently in a second exemplary embodiment of the invention, as well as the two recording heads employed in the exemplary embodiment being initially described herein.

Housing 20, as shown in FIG. 2, is provided with a guide lip 21 which directs the sheet material 50, from left to right in FIGS. 1 and 2, into a sheet channel 22 disposed on the top of the housing 20 and through which the sheet material 50 passes during the processes of recording, dictated, oral and written intelligence thereon. Sheet 50 is processed in the same direction when it is ultimately reinserted to reproduce and present such oral and visual intelligence. The top of the sheet channel 22 is preferably fabricated of transparent material to facilitate viewing of the material 50 before it reaches the recording position.

Sheet material 50 is preferably made of a transparent or translucent strip or carrier of plastic or paper material coated with paramagnetic recording material such as iron oxide powder, iron, or an iron alloy. The paramagnetic recording material is deposited upon the lower surface of sheet 50 in transversely extending narrow parallel and spaced bands 51. Longitudinal margins 52 and 53 should be left uncoated when depositing bands 51 on sheet 50 to allow marginal areas thereon suitable for the provision of perforations 54. Perforations 54 facilitate the advancement of the sheet material 50 through the dictating machine and aid in registering the individual bands 51 with either of the recording heads 32 or 33 when in a recording or reproducing movement. Paramagnetic recording bands 51 are disposed upon the downwardly facing side 55 of the sheet 50, as shown in FIG. 1, to come into alignment with the recording heads 32 and 33. A recording aperture 23, extending transversely across the top of housing 20, is provided to allow the magnetic heads 32 and 33 to act upon successive bands 51 as they are brought into alignment therewith. Each band 51, when positioned within the aperture 23 is acted upon by one of the recording heads passing transversely along and beneath such band to either record intelligence thereon, or reproduce such intelligence therefrom. The opposite, upwardly facing side 56 of the sheet 50 is preferably provided with a mat texture to facilitate marking and writing thereon. As the bands 51 on bottom side 55 of sheet 50 are being acted upon by either of the heads 32 or 33 in recording or reproducing motions, markings and other written intelligence of corrective or additive nature may be placed on the upper surface of sheet 50 which may thereafter be viewed and perceived upon the upper side 56. Such relative positioning of the bands 51, aperture 23 and recording heads 32 and 33, permits the desired corrections or insertions to be marked accurately at the position on the mat surface 56 of sheet 50 exactly opposite the spot on a particular band 51 where an error may occur. Such accurate marking may be easily accomplished since the position of a particular head of recording heads 32 or 33 which is aligned with aperture 23, may be readily seen through the transparent, or translucent sheet 50 at the moment an error is noted and such markings as desired may be positioned accordingly. A light 27 may be positioned within the case or housing 20 to aid in such visual perception. A second viewing aperture 24 may be provided in the housing 20 to allow further visual observation of such written intelligence as the sheet 50 proceeds on through the dictating machine.

Means for advancing the sheet material 50 through the channel 22 and past the recording heads 32 and 33 are provided as generally indicated at 40. The sheet advancing means, as best seen in FIGS. 2 and 3, consist in part of a shaft 41 and sprocket wheels 42 and 43 mounted thereon which engage the perforations 54 in margins 52 and 53 of sheet material 50 to advance it through the channel 22. Shaft 41 is journaled upon an inner housing member 26 and extends on through housing 20 at one end. This end of shaft 41 is provided with a manually controllable knob 44. Knob 44 is thereby positioned on the outside of housing 20 and may be used to advance the sheet 50 manually through the channel 22 as the sprocket wheels engage successive perforations 54. Means may be provided for insuring that the sprocket wheels normally assume a rest position wherein a recording medium band 51 is always in proper alignment. Such means may comprise a spring detent including a ball 45 having a bias towards the sprocket wheel 42 provided by a leaf spring 46, as shown in FIG. 3. Slots or depressions 47 may be disposed circularly about the web of wheel 42 and positioned thereon in predetermined relation to the sprocket teeth on wheels 42 and 43 so that the shaft 41 may be urged into definite successive rest positions, as it is rotated, due to the successive binding effect of the ball 45 in such slots 47. Sprocket wheels 42 and 43 may be thereby urged, into successive rest positions when advancing the recording sheet material 50 wherein an individual band 57 of paramagnetic band 51 will be properly aligned with aperture 23. The recording head disposed thereunder may then act upon such band 57 through aperture 23 and such written intelligence as desired may be inserted thereon from above. In addition to the manual advance and positioning of the sheet in the machine, means are provided for automatically advancing the sheet 50 in steps or increments, as will be later described.

As best shown in FIG. 3, each recording head 32 and 33 is mounted upon a channel member or carriage 34 and 35 respectively. Recording head 32 is shown in FIGS. 1, 2 and 3 in recording relation to a recording band 57 on sheet 50. The carriages 34 and 35 are mounted upon a U-shaped yoke frame 60 including parallel spaced U-shaped side elements 61 and 61′ connected at their lower portions by a shaft 59. The shaft 59 is journaled upon inner housing member 26 in a direction transverse to the housing 20. Frame 60 is thereby mounted for oscillatory movement about an axis passing through its lower portion transversely to the housing 20. Each U-shaped side 61 and 61′ has upwardly extending arms 63 and 64 and 63′–64′. Two pairs of spaced generally parallel guide bars extend transversely between the sides 61 and 61′ upon which the carriages 34 and 35 are slidably mounted. As best seen in FIG. 3, a top guide bar 71 joins arms 63 and 63′ and a top guide bar 72 joins arms 64 and 64′. A pair of inner side plates 67 and 68 are disposed next to arms 63 and 64, respectively, and a pair of inner side plates 69 and 70 are disposed next to arm 63′ and 64′ respectively. The top guide bars 71 and 72 extend through an upper portion of these inner side plates in a loose fit and are fixed to the U-shaped sides 61 and 61′. Bottom guide bars 73 and 74 extend between and are fixed to the inner side plates 67 and 69 and 68 and 70, respectively. Since the inner plates are thereby pivotally mounted at their upper ends upon the upper guide bars 71 and 72, they are provided with a spring bias at their lower ends to normally hold each pair of adjoining plates 67 and 68, and 69 and 70 against stop elements on each arm when not in recording position. Such bias may be provided by a spring joining the lower ends of the inner plates on each U-shaped side element of yoke frame 60, as illustrated in FIG. 2 where a spring 300 is shown joining inner plates 67 and 68 at their lower ends urging them against stop elements 301 and 302. Therefore, when the yoke frame 60 oscillates a recording head into alignment with the underside of the top of housing 20, the head and carriage may pivot about the axis of the top guide bar to which they are mounted. Such pivotal motion aids in effecting and maintaining a snug contacting relationship between the recording head and the underside of the top of housing 20, and the recording aperture 23 therein, as the recording head moves transversely across the housing 20 in a recording or reproducing movement.

The magnetic sound recording head 32 and carriage 34 are slidably mounted upon the transversely extending guides 72 and 74 while the recording head 33 and carriage 35 are slidably mounted upon the transversely extending guides 71 and 73. As best seen in FIG. 3, the recording heads 32 and 33 may therefore slide along the guides transversely to the path of sheet material 50. Recording heads 32 and 33, being mounted upon yoke frame 60, are thereby positioned within housing 20 to be alternatively oscillated into alignment with the aperture 23 and one of the paramagnetic recording bands 51 disposed thereabove. While so aligned, a recording head may be moved transversely, from left to right in FIG. 3, across the housing 20 and beneath an aligned band 57 by sliding movement upon the aforementioned guides in a recording or reproducing relationship with such band 57.

Figures 4, 5, 9:
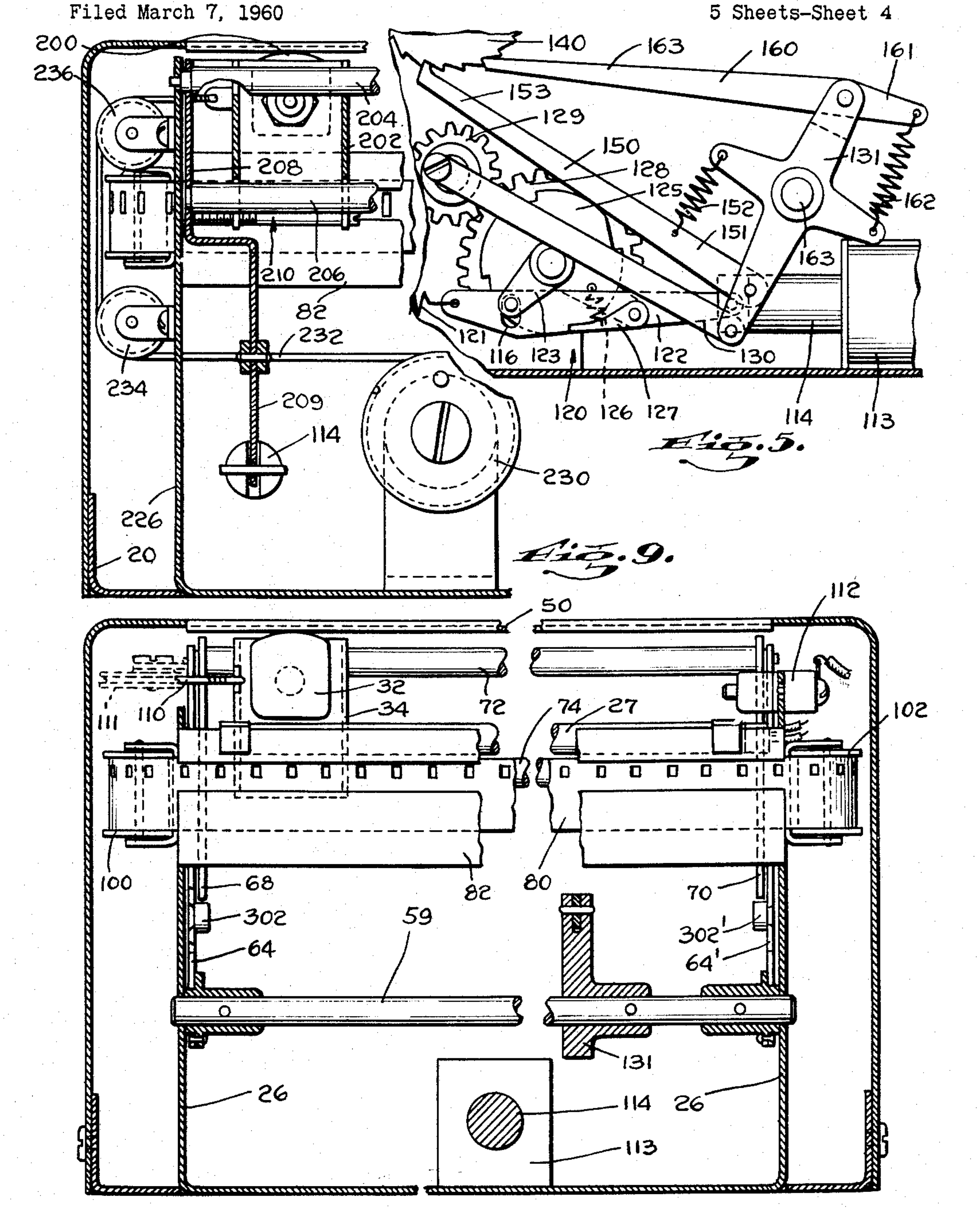
FIG. 4 is a cross sectional view of the machine of FIG. 2 taken along the plane IV—IV.
FIG. 5 is a detail view of part of the machine of FIG. 2.
FIG. 9 is a cross sectional view of the portion of the alternative embodiment shown in FIG. 6 along the plane IX—IX.

Means for repetitively moving the magnetic sound recording heads in such aforementioned transverse recording relationship to successive bands 51 of recording sheet 50 are also provided. These means, in the exemplary embodiment may comprise generally a continuous driving band 80, carriages 34 and 35 which cooperate with band 80 to advance the recording heads 32 and 33; means for driving band 80; means for engaging the carriages with the driving band 80; and means for disengaging the carriages from driving band 80. The continuous driving band 80, as shown in FIGS. 2, 3 and 4 is mounted within the housing 20 to be driven in one direction only by the driving means illustrated. These driving means include, in part, an electric motor 90 which is supported upon a stand 91, which in turn is anchored to the floor of housing 20. A plate 92 and a train of pulleys 94, 95, 96 and 97, mounted thereon, may be added to motor 90 to facilitate driving band 80. Plate 92 is placed upon the top end of motor 90 allowing the motor shaft 93 to extend therethrough. Motor 90 may therefore energize the train of pulleys 94, 95, 96 and 97 as it rotates its shaft 93. This pulley train is adapted to reduce the normally relatively high angular velocity of the electric motor shaft 93 to a lower value for the pulley 97 which engages the band 80. Band 80 may thereby be provided with a more suitable velocity for moving a recording head beneath the sheet material 50. The further provision of a shaft 98 and a manually controllable knob 99, positioned externally of the housing 20, allows the manual rotation of the band engaging pulley 97. The knob 99 may therefore be used to manually advance or back up the band 80.

Band 80 is directed about two pairs of directing pulleys 100 and 101 and 102 and 103, respectively, to provide a lay 81 which moves transversely to the housing 20 through the band channel 82, preferably in a plane perpendicular to the plane of sheet 50. Motor 90, turning in one direction only, provides the lay 81 with such transverse motion in one direction only (from left to right in FIG. 3). An adjusting pulley 105 may also be provided which is adapted to move within a slot 106 in top plate 92 to adjust the tension of the continuous driving band 80 as required. Band 80 is also provided with spaced longitudinally disposed registry perforations 83 along its entire length to cooperate with means for engaging the carriages 33 and 35 with the driving band 80.

Means for engaging the carriages 34 and 35 with the driving band 80 are provided to move the carriages transversely across the housing 20. Referring first to FIGS. 2 and 3, the oscillating yoke frame 60 is shown in one of its recording positions wherein the carriage 34 and recording head 32 are positioned at the beginning of a transverse recording movement beneath the recording aperture 23. The means provided for engaging carriage 34 and the band 80 when the head 32 is oscillated into this position, in the exemplary embodiment, consists of a pin 36 associated with the carriage 34. A corresponding pin 37 is associated with the carriage 35 to engage it with band 80. The pins 36 and 37 are inserted into and removed from the registry perforations 83 of the driving band 80 as the yoke oscillates. When the yoke frame 60 is in the position of FIGS. 2 and 3, pin 36 engages driving band 80, and as band 80 progresses transversely across the housing 20, the recording head 32 is moved transversely beneath the aligned recording band 57 in recording relation thereto. Upon the next oscillation of frame 60, the pin 37 engages band 80. The carriages 34 and 35 are preferably interconnected by a rope 110 which is directed around a pulley 111. Therefore, as recording head 32 and carriage 34 are moved transversely across the housing 20, to the right, in FIG. 3 toward the end of a recording movement, the recording head 33 and carriage 35 are drawn in a nonrecording return movement in the opposite direction (to the left in FIG. 3) to be positioned to re-engage the driving band 80. When the carriage 34 reaches the end of its recording movement, it actuates means for oscillating the yoke frame 60 into another position thereby disengaging carriage 34 from the driving band 80, engaging the recording head 33 and carriage 35 to the driving band 80 and initiating the recording movement of the recording head 33. These yoke oscillating means may consist in part of a microswitch 112 which is contacted by the recording heads 32 or 33 when they reach the end of their individual recording movement. In addition, a solenoid 113 and a gear train, indicated generally at 120, may be provided which are placed in motion by the microswitch 112 to oscillate the yoke frame 60 as desired. When the mechanism is in the particular position shown in FIGS. 2 and 3, microswitch 112, on being contacted by recording head 32 temporarily deactivates the solenoid 113. This allows a spring 121 acting upon a gear train to oscillate the yoke frame 60 about its axis 59 disengaging the carriage 34 from the band 80 and engaging the carriage 35 with band 80. After the carriage 35 has been moved transversely across housing 20 in its recording movement, it also will subsequently contact the microswitch 112. The solenoid 113 is only temporarily de-energized by an interruption of the electric current thereto by a recording head contacting microswitch 112 so that the spring 121 may operate on the gear train indicated generally at 120. Upon the subsequent restoration of the current, the solenoid 113 returns the gear train to the position of FIG. 2 for the next successive de-energization of solenoid 113 to oscillate yoke frame 60 into the next successive position, as will become more readily apparent hereafter when the gear train, indicated at 120, is described in detail.

As best seen in FIGS. 2 and 5, the above referred to gear train, indicated generally at 120, which cooperates with the solenoid 113 and spring 121 to cause oscillation of the yoke frame 60, is preferably constructed as hereafter described. A horizontal drive bar 122 is positioned between and connecting the spring 121 and the solenoid 113, the latter being connected to bar 122 by means of a pivotal connection 114 with a central core member 115 within the solenoid 113. As readily seen by a comparison of FIGS. 2 and 5, a generally horizontal movement of drive bar 122 from right to left in FIGS. 2 and 5 under the urging of spring 121 when solenoid 113 is de-energized, moves the bar 122 and gear train from the position of FIG. 2 to that shown in FIG. 5. During such motion, drive bar 122 turns a reciprocating right angled lever arm 123 through a 90° arc of rotation upon a shaft 124, which is journaled upon the inner housing member 26. Lever arm 123 is mounted upon such shaft 124 to allow alternate reciprocating motion back and forth through such 90° arc and is connected to drive bar 122 in association with a slot 116 to compensate for the vertical travel of the end of such arm when it rotates on shaft 124. Lever arm 123 acts upon a ratchet wheel 125 adapted to be positively rotated clockwise in FIGS. 2 and 5 by successive clockwise arcuate rotation of lever arm 123 due to the successive engagements of the spring biased pawl 126 with successive steps on the ratchet wheel 125. Pawl 126 is constantly braced toward the ratchet wheel 125 by spring 127. Upon the subsequent energizing of the solenoid 113, upon resumption of the temporarily interrupted electric current, the drive bar 122 returns from the position of FIG. 5 to that of FIG. 2 (to the right in FIGS. 2 and 5) moving the lever arm 123 in counterclockwise arcuate rotation through 90° to cause the pawl 126 to engage the next step on wheel 125 in preparation for the next successive de-energizing of solenoid 113 and the corresponding next forward movement of bar 122. Ratchet wheel 125 thereby is successively rotated in the same direction through steps of 90° arcuate rotation. A gear wheel 128 may be either fixedly attached to or integrally formed with ratchet wheel 125 to provide a corresponding constantly clockwise rotation of such gear 128 through successive steps of 90° rotation. A pinion gear 129, having exactly half as many gear teeth as gear wheel 125, may be positioned to engage gear 125 so that a 90° rotation of gear 125 will provide a 180° rotation of pinion gear 129. A lever arm 130 is pivotally connected to pinion 129 at a point thereon spaced from its axis. Such attachment of arm 130 and the relationship of gear wheels 128 and 129 transforms the successive always counterclockwise rotation of pinion 129 into successive reciprocating back and forth motion of arm 130. Arm 130 in turn transmits such motion to the lower end of a star lever 131. Star lever 131 having two generally vertical opposed arms and two generally horizontal opposed arms fixedly mounted upon shaft 59 is part of the yoke frame 60, so that as the star lever 131 oscillates the shaft 59, yoke frame 60 oscillates correspondingly. Thus, as the pinion 129 rotates in successive counterclockwise 180° rotation, the yoke frame 60 is oscillated successively and alternatively from the position shown in solid line in FIG. 2 to that shown in FIG. 5 and back again. The alternative positioning of either of the recording heads 32 and 33 is thereby accomplished upon successive contacts of the recording heads 32 and 33 with the microswitch 112. Such contact with the microswitch 112 breaks the circuit, de-energizing solenoid 113, and oscillating the yoke frame 60 as described. The resulting disengagement of the microswitch 112 by the recording head making such contact as the yoke 60 oscillates, causes the solenoid 113 to be re-energized, restoring the gear train, indicated generally at 120, to the rest position of FIG. 2 in preparation for the next successive de-energization of solenoid 113 and the next successive oscillation of yoke 60. Such oscillation of the yoke frame 60 is thereby provided automatically once the machine is placed in operation. It therefore is desirable to provide equally automatic means for advancing the sheet material 50 longitudinally above the recording heads 32 and 33 in successive rest position in which the individual bands 51 are successively aligned with one of the recording heads 32 or 33. Incremental advancement means for advancing sheet material 50 longitudinally between successive transverse recording movements of either of the recording heads 32 and 33 are therefore provided.

In the preferred embodiment, as best seen in FIGS. 2 and 3, such incremental advancement means may consist generally of the further provision of a stepped wheel 140 and two spring biased pawl arms 150 and 160. The stepped wheel 140 is mounted upon the shaft 41 so that when wheel 140 is turned, the sprocket wheels 42 and 43 will be rotated and thereby advance sheet material 50 through the machine. Stepped wheel 140 is advanced through successive increments of rotation by the alternative action of pawl arms 140 and 150 which are connected to star lever 131 and are motivated by the oscillatory motion of such lever 131.

Pawl arm 150 may be pivotally connected at its rearward end 151 to the lower generally vertical arm of star lever 131 and biased upwardly by a spring 152, connecting an intermediate portion of arm 150 to the forward generally horizontal arm of star lever 131. Pawl arm 150 may thereby have its forward end 153 constantly urged against the stepped wheel 140. When the star lever 131 is oscillated upon the shaft 63, by the aforedescribed action of the gear chain, indicated generally at 120, when the solenoid 113 is temporarily de-energized, it moves from the position of FIG. 2 to that of FIG. 5 causing the lower pawl arm 150 to rotate the stepped wheel 140. The radius of stepped wheel 140 and the length of the arcuate travel of the lower end of star lever 131 may be determined such that the resulting increment of clockwise rotation of wheel 140 will cause the sprocket wheel 42 and 43 to advance the sheet material sufficiently far to align the next successive band 51 of paramagnetic recording material within the recording aperture 23. In this embodiment, therefore, the same oscillation of star lever 131 may be employed to alternately align the recording heads 32 and 33 beneath the aperture 23 and to successively align the recording band 51 within aperture 23.

Top pawl arm 160 may be pivotally connected to the upper generally vertical arm of star lever 131 at a point spaced from its rearward end 151. A spring 162 may be connected between such end 161 and the rearward generally horizontal arm of star lever 131 to bias arm 160 such that its forward end 163 is constantly urged against the wheel 140. Upon the next de-energization of solenoid 113, the star lever is oscillated from the position of FIG. 5 to that of FIG. 2 causing the top pawl arm 160 to rotate the stepped wheel 140 through another 90° incremental clockwise rotation. Such rotation, ultimately transmitted by shaft 41 to sprocket wheels 42 and 43, may advance the next successive band 51 into alignment with the aperture 23 where the other recording head 33 has automatically been positioned.

It should be noted, that in this preferred embodiment, the de-energizing of the solenoid 113 by the contacting of microswitch 112 by either of the recording head carriages 34 or 35 causes both the oscillation of yoke frame 60, moving the recording heads 32 and 33 alternatively into and out of recording relation with sheet material 50, and the incremental advancement of successive band 51 of paramagnetic material into alignment with such head positioned for a recording movement.

In addition, since it may be desirable to occasionally back up the sheet material 50 manually by means of the knob 44, the stepped wheel 140 is preferably journaled upon shaft 41 in association with detent means 170. This means, as shown in FIG. 3, may comprise in part the provision of a wheel 171 having opposed collar portions 172 and 173 extending along shaft 41 and fixed thereto. Stepped wheel 140 may be rotatably journaled upon one such collar 173 and normally held from rotation thereon by the further provision of a spring detent. Such spring detent may include a ball 174 biased by a spring member 175 toward one of a plurality of indentations or ports 176 in wheel 140. Wheel 140 is thereby normally held from rotation thereon. The normal driving motion of the wheel 140 due to the action thereon by pawl arms 150 and 160 is thereby transmitted to shaft 41 due to the binding effect of the detent means 170. However, when it is occasionally desirable to back up the sheet material, knob 44 may be manually turned counterclockwise (in FIG. 2) overcoming the binding effect of detent means 170 and rotating shaft 41 and sprocket wheels 42 and 43 in the same direction. The stepped wheel 140 is restrained from such similar counterclockwise rotation by the pawled arms 150 and 160. The detent means 170 therefore allow wheel 140 to be disengaged from shaft 41 when the ball 174 is forced out of the particular indentation or port of ports 176 in which it was positioned. Shaft 41 is thereby freed from the absolute constraining effect of stepped wheel 140, which would normally exist without the provision of such detent means, relative to backward movement of sheet material 50. The sheet advancing means may be operated in a forward direction without interference from the incremental advancement means since the pawl arms 150 and 160 do not prevent such forward or clockwise rotation of stepped wheel 140.

An alternative exemplary embodiment of a recording machine, according to the invention, is illustrated in FIGS. 6, 7, 8 and 9. This embodiment employs basically the same component parts as does the first embodiment described previously, except where hereafter noted.

The alternative exemplary embodiment of FIGS. 6, 7, 8 and 9 preferably employs a single recording reproducing and erasing head 200 mounted upon a carriage 202 and is preferably provided with means for providing repetitive transverse recording motion of such recording head beneath the sheet material 50 and means for providing a rapid return of the carriage 202 and head 200 to a starting position after the completion of each successive transverse recording motion as hereafter described.

Carriage 202 may be slidably mounted for transverse movement beneath sheet material 50 across the housing 20 upon a pair of transversely extending bars 204 and 206. The transversely extending slide bars 204 and 206 are preferably disposed parallel to each other and spaced in generally vertical alignment, the transverse bar 204 being positioned above the bar 206 and pivotally mounted on the inner housing 226. Side elements in the form of generally rectangular blocks may be attached at either end of the pair of parallel spaced bars 204 and 206 in order to contain the carriage 202 on the bars 204 and 206, to support lower bar 206 which does not contact the inner housing 26, and to form a frame 210 which may pivot about the axis of the top bar 204. The left side element 208, seen in FIG. 9, is provided with a lever arm 209, preferably formed integrally with element 208, which is connected at its lower end to the core member 114 of the solenoid 113. Frame 210 may thereby be oscillated about the axis of bar 204 upon successive movement of the core member 114 of solenoid 113. A spring 212 anchored on the inner housing 226 by a pin 213 may be positioned to bias the lever arm 209 into counterclockwise movement (in FIG. 6) about guide 204 to position the recording head 200 in recording relation with the sheet material 50, the spring 212 acting when the solenoid 113 is de-energized. Upon energizing solenoid 113, the frame 210 is oscillated from the position of FIG. 6 to that of FIG. 7 where the recording head 200 is in a non-recording position in relation to the recording aperture 23 and recording sheet material 50.

Means for repetitively moving the magnetic sound recording head 200 transversely across the housing 20 in recording relation to successive paramagnetic bands 51, in the alternative embodiment, may include the driving band 80 and means for driving the band 80 as in the first exemplary embodiment described previously. In addition, a modification of the means for engaging and means for disengaging the carriage 202 with the band 80 to provide such repetitive motion may be provided. The means for engaging band 80 may comprise in part a pin 220 provided upon carriage 202 which may engage one of the perforations 83 in the lay 81 of band 80 when the solenoid 113 is de-energized. As previously noted, such de-energizing of solenoid 113 allows the spring 212 to move the lever arm 209 and oscillate the frame 210 into the recording position shown in FIG. 6. In this position, the pin 220 engages one of the perforations 83 of band 80 causing carriage 202 to be slidably moved along with band 80 across housing 20 in a recording or reproducing relationship.

Figures 6, 7, 8:
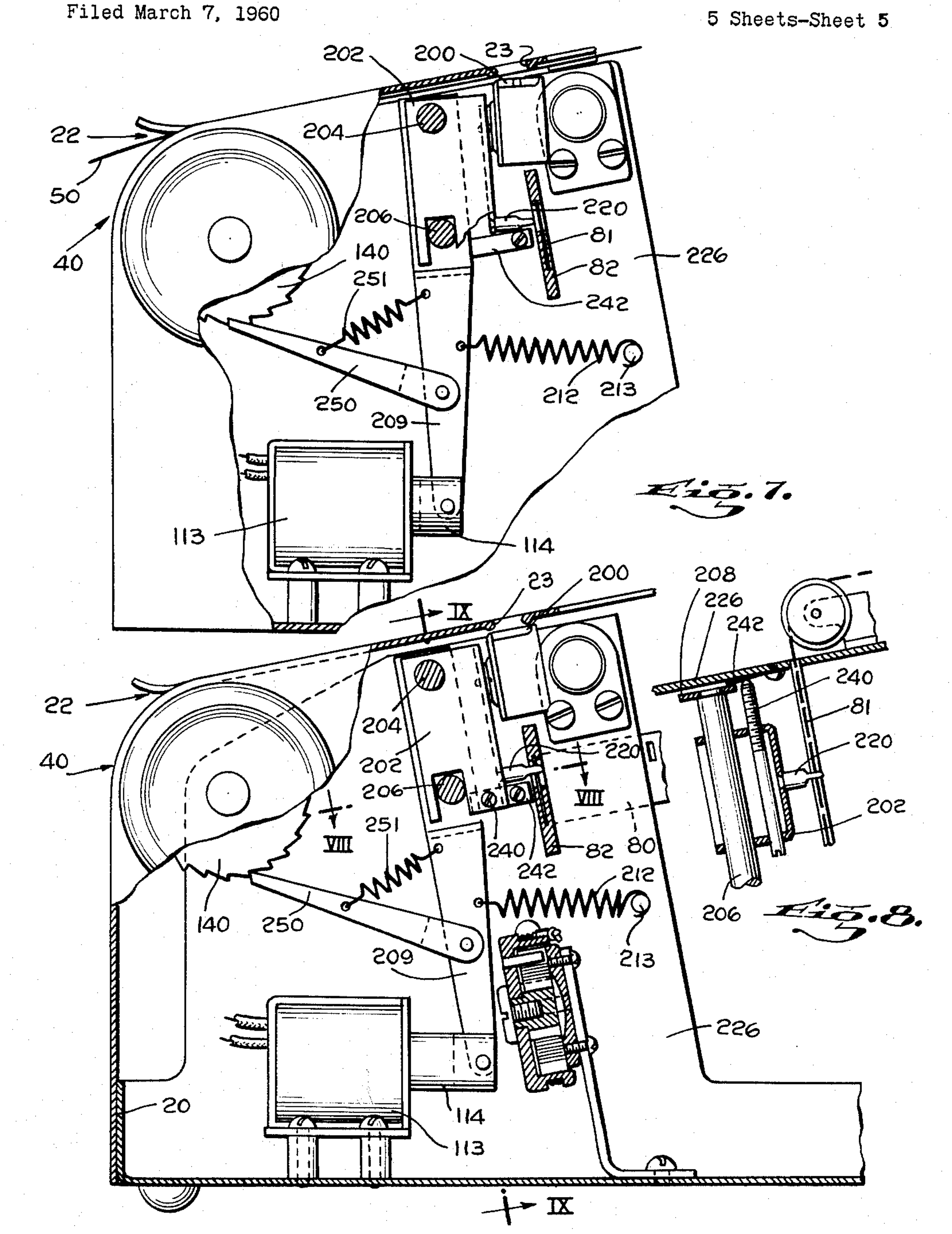
FIG. 6 is a sectioned side elevation of a portion of an alternative embodiment of the machine of FIG. 1.
FIG. 7 shows the mechanism of FIG. 6 in another position.
FIG. 8 is a detail plan view of a portion of the machine of FIG. 6.

Means for disengaging the carriage 202 at the end of its transverse recording motion may include, in part, the provision of a microswitch, such as the microswitch 112 of FIG. 3, which activates the solenoid 113 when contacted by the recording head 200 upon the latter's reaching the end of its transverse recording motion. Upon the closing of microswitch 112 by being contacted by the recording head 200, the frame 210 is automatically oscillated into a non-recording position, as shown in FIG. 7, due to the temporary energization of the solenoid 113. The carriage 202 and pin 220 are thereby automatically disengaged from the constantly moving band 80. The carriage 202 is then in a position to be returned, in a non-recording transverse motion, into a position to again engage the driving band 80 in a starting position for the next successive recording motion.

The means for returning recording head 200 into position to re-engage driving band 80 at the start of a transverse recording motion may include a spring biased reel 230 about which one end of a line 232 may be wound.

The spring bias of reel 230 is adapted to constantly urge reel 230 and a portion of line 232 into a wound relationship. The other end of line 232 is directed about two pulleys 234 and 236 and then connected to the carriage 202, as shown in FIG. 9, when the reel 230 and line 232 is in such wound position. As the carriage 202 moves transversely across the housing 20, therefore, line 232 is unwound from reel 230 against the urging of the inherent spring bias of reel 230. When the carriage 202 is disengaged from the drive band 80 by the aforementioned disengaging means wherein the frame 210 is oscillated into the position of FIG. 7, carriage 202 is rapidly returned in a non-recording transverse motion by the action of the reel 230 rewinding the line 232 thereon.

As shown in FIG. 8, the carriage 202 may also be provided with an adjustable screw 240, which is adapated to abut against a leaf spring 242 upon the end of such a non-recording transverse motion. The unsupported end of the leaf spring 242 is biased away from the inner housing 226 but is locked between the housing 226 and the left side element 208 (FIG. 8) whenever the carriage 202 is in recording position. As soon as the solenoid 113 pivots the frame 210, the unsupported end of the leaf spring 242 is released and snaps forward to intercept the left side element 208 and preventing it from returning to recording position until depressed by adjustable screw 240, at which instant the frame 210 is returned again into recording position.

The incremental advancement means for advancing sheet material 50 longitudinally through the channel 22 of housing 20 between successive transverse recording movements of head 200, in the exemplary embodiment of FIGS. 6, 7, 8 and 9, may comprise, in part, a spring biased pawl arm 250 which cooperates with the lever arm 209. Pawl arm 250 may be pivotally connected at one end to an intermediate portion of lever arm 209 and may be biased in an upward direction by a spring 251, connecting an intermediate portion of pawl arm 250 to an upper portion of lever arm 209. The upward bias provided by spring 251 urges the pawl arm 250 constantly against the stepped wheel 140. Referring to FIG. 6, it may be seen that upon the temporary energization of solenoid 113 by the microswitch 112 will cause the lever arm 209 to swing to the left (in FIG. 6) causing the pawl arm 250, in turn, to rotate the stepped wheel 140 and the sheet advancing means, indicated generally at 40, in clockwise rotation. The sheet advancing means may thereby advance sheet material 50 to align the next successive recording band 51 with the recording aperture 23 in the top of housing 20. When the temporary flow of current to solenoid 113 is interrupted, the spring 212 will return the lever arm 209 and frame 210 from the position of FIG. 7 to that of FIG. 6 causing the pawl arm 250 to slide back over the stepped wheel 140 into engagement with the next step thereon. The sheet material 50 may thereby be incrementally advanced to align the next successive recording band 51 with the recording head 200 upon each successive non-recording motion of the carriage 202 and head 200.

A dictating machine, according to the invention, may therefore be made in a compact, simple and effective form to record spoken sounds and words upon a sheet of material having a plurality of transversely extending narrow parallel and spaced bands of paramagnetic recording media. Written corrections or additions may be applied easily and accurately to the upwardly facing matt-textured surface of the recording sheet material as it is being processed through the machine during the recording operation. Such markings may be readily observed visually and then mentally integrated with the aurally perceivable reproductions of the intelligence recorded on the sheet material during subsequent reproducing operations. In addition, because of the sheet form employed by the recording material, such recordings may be easily mailed or filed with other forms of correspondence such as normally typed or written letters.

While two preferred exemplary embodiments of a dictating machine, according to the invention, have been disclosed and described herein in detail, it should be understood that other modifications and adaptations may be made within the scope of the invention as defined by the following claims.

I claim:

1. A machine for producing letters and other communications containing dictated and written intelligence comprising, in combination with a housing containing an electro-acoustic transducer system, the provision of: means within the housing for advancing sheet material having longitudinal margins and a plurality of transversely extending, narrow, parallel, and spaced bands of paramagnetic recording medium; a U-shaped yoke frame with upwardly extending arms within the housing, said arms being connected by a pair of transversely extending guides, said yoke frame being mounted for oscillation about an axis passing through the lower portion of such frame parallel to said guides and transverse to the housing; a continuous driving band having a lay moving transversely and continuously in one direction between said pair of guides; a magnetic sound recording head and carriage slidably mounted on each of said guides; means for engaging one carriage with the driving band at the beginning of a transverse recording movement of its head in one position of said oscillatable yoke frame; said carriages being interconnected, whereby a recording movement of one carriage and head is translated into a non-recording return movement of the other carriage and head; means actuated by a moving carriage for oscillating said yoke frame into another position to disengage one carriage from said driving band at the end of a transverse recording movement of said one carriage and its head and engage the other carriage with said driving band and initiate recording movement of the head carried by such other carriage; and incremental advancement means for advancing said sheet material longitudinally between successive transverse recording movements of said heads.

2. A machine for producing letters and other communications containing dictated and written intelligence comprising, in combination with a housing containing an electro-acoustic transducer system, the provision of: means within the housing for advancing sheet material having longitudinal margins and a plurality of transversely extending, narrow, parallel, and spaced bands of paramagnetic recording medium carried on a lower surface of said sheet, a top surface of said sheet being of matt texture; a magnetic sound recording head within the housing associated with the electro-acoustic transducer system; means for repetitively moving said head transversely in a generally horizontal path in recording relation to successive bands of said paramagnetic recording medium on said sheet; incremental advancement means associated with said sheet advancing means for advancing said sheet material longitudinally of said housing between successive transverse recording movements of said head; and a transversely extending writing aperture disposed in said housing directly above the transverse generally horizontal path of said recording head whereby visibly observable written intelligence may be placed upon said top matt surface of said sheet material in accurate relation to the intelligence recorded on bands of recording medium on said lower surface.

3. A machine for producing letters and other communications containing dictated and written intelligence, comprising: a housing having a top surface provided with a transversely extending aperture; a generally horizontally disposed sheet channel provided in a forward, upper portion of said housing adapted to receive and direct sheet material longitudinally of said housing below and past said transversely extending aperture exposing portions of the top surface of said sheet material; means within said housing for advancing sheet material received in said channel through said housing; a magnetic sound recording head within said housing adapted to be associated with an electro-acoustic transducer system; and means for repetitively moving said head transversely of said housing directly below said transversely extending aperture in recording relation to said sheet material, said sheet material having a paramagnetic recording medium on a bottom surface thereof to be acted upon by said recording head.

4. A machine for producing letters and other communications containing dictated and written intelligence comprising, in combination with a housing having a generally horizontal transversely extending aperture in a top surface thereof, the provision of: sprocket means carried within the housing for advancing sheet material longitudinally of said housing and across said aperture; a magnetic sound recording head within the housing; means for repetitively moving said head transversely of said housing in a generally horizontal path directly beneath said aperture in recording relation to said sheet material; and means for advancing said sheet material longitudinally of said housing between successive transverse movements of said head.

5. A machine for producing letters and other communications containing dictated and written intelligence comprising, in combination with a housing including electro-acoustic transducer means adapted to convert spoken sounds into electrical impulses, the provision of: means within the housing for intermittently advancing sheet material therethrough, said sheet material being provided with a bottom surface having a succession of separate, parallel, strips of paramagnetic material extending transversely of said sheet and transversely to the direction of advancement of said sheet; a magnetic sound recording head within the housing adapted to receive electrical impulses from the transducer and record such impulses on said sheet; means for moving said head transversely in a generally straight line path beneath said sheet in recording relation to a strip of paramagnetic material on the bottom surface of said sheet; and means for advancing said sheet material longitudinally between successive transverse movements of said head, said housing being provided with an elongated slot directly above the path of said recording head exposing top surface area of said sheet directly above a strip of paramagnetic material in recording relation to said head, said top surface of said sheet being matt textured and adapted to receive visible indicia applied by a writing instrument through said slot.

6. A machine for producing letters and other communications containing dictated and written intelligence comprising, in combination with a housing containing an electro-acoustic transducer system, the provision of: means within the housing for advancing sheet material having a lower surface coated with a paramagnetic recording medium and a top surface provided with a generally matt texture to receive written intelligence thereon; a continuous driving band having a lay moving continuously transversely to said sheet material; a pair of magnetic sound recording heads slidably mounted within said housing below said sheet material; means for successively engaging each of said magnetic sound recording heads with said band to move them through successive transverse recording movements in recording relation to said lower surface of said sheet material; means for successively disengaging each of said magnetic sound recording heads from said band at the end of a transverse recording movement; and means for successively returning each recording head in a transverse return movement, when disengaged from said band at the end of a transverse recording movement, in non-recording relation to said sheet material to a position to engage said band at the beginning of a transverse recording movement, each of said magnetic sound recording heads moving in a non-recording transverse return movement when the other is moving in a transverse recording movement.

References Cited by the Examiner

UNITED STATES PATENTS

| | | | |
|---|---|---|---|
| 2,245,286 | 6/41 | Marzocchi | 179—100.2 |
| 2,648,589 | 8/53 | Hickman | 178—6.6 |
| 2,782,043 | 2/57 | Andrews | 179—100.2 |
| 2,915,596 | 12/59 | Lyon | 179—100.2 |
| 2,964,324 | 12/60 | Brasseur | 179—100.2 |
| 2,973,410 | 2/61 | Hoshino et al. | 274—41.4 |
| 2,986,725 | 5/61 | Dirks | 340—174.1 |
| 2,998,494 | 8/61 | Nations | 179—100.2 |

FOREIGN PATENTS

| | | |
|---|---|---|
| 1,041,699 | 10/53 | France. |
| 1,063,823 | 8/59 | Germany. |

I. L. SRAGOW, *Primary Examiner.*

E. J. SAX, N. N. LOVEWELL, *Examiners.*